Nov. 13, 1962
G. A. GRIEM
3,063,433
ROTARY ENGINE
Filed July 7, 1961
2 Sheets-Sheet 1
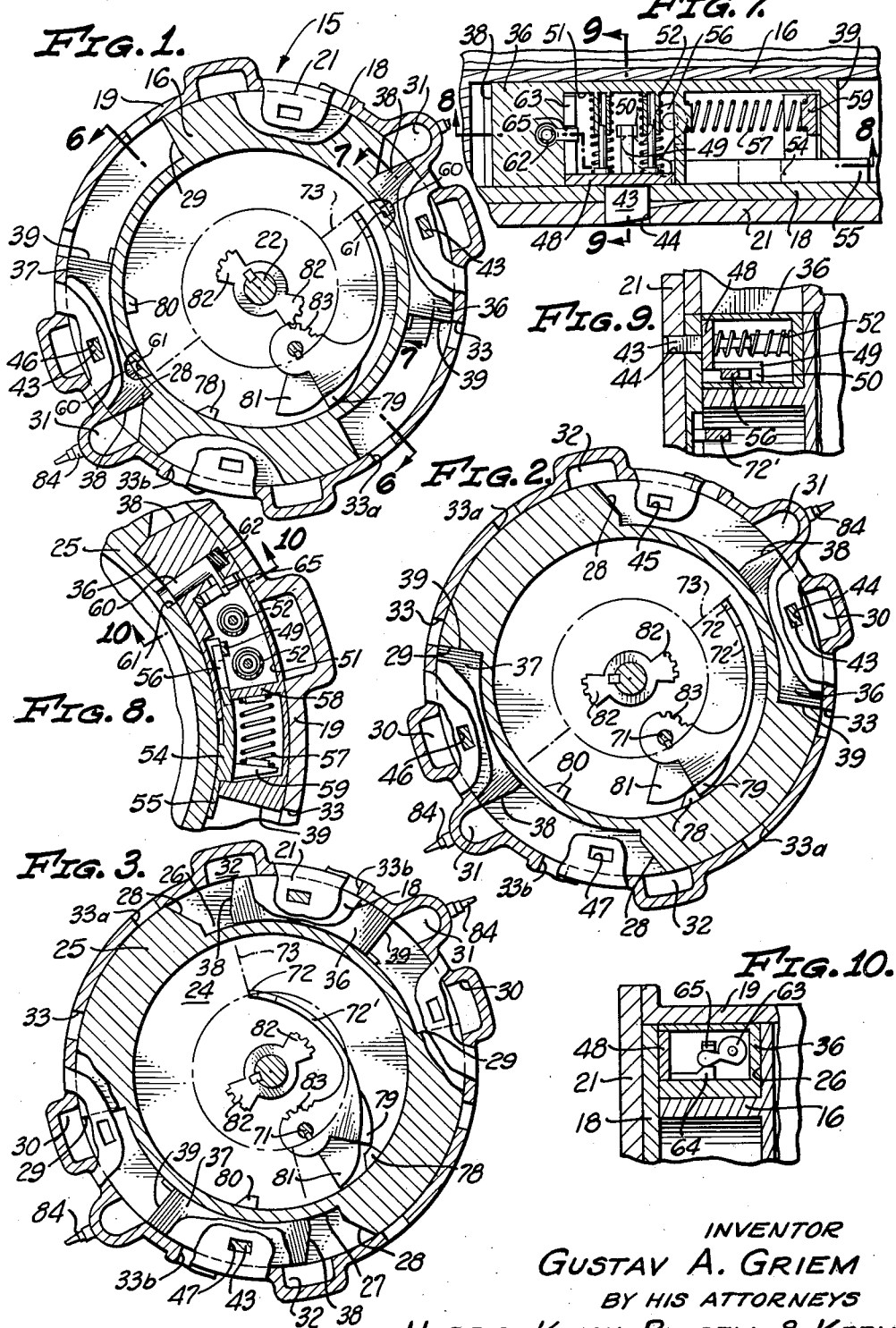
INVENTOR
GUSTAV A. GRIEM
BY HIS ATTORNEYS
HARRIS, KIECH, RUSSELL & KERN

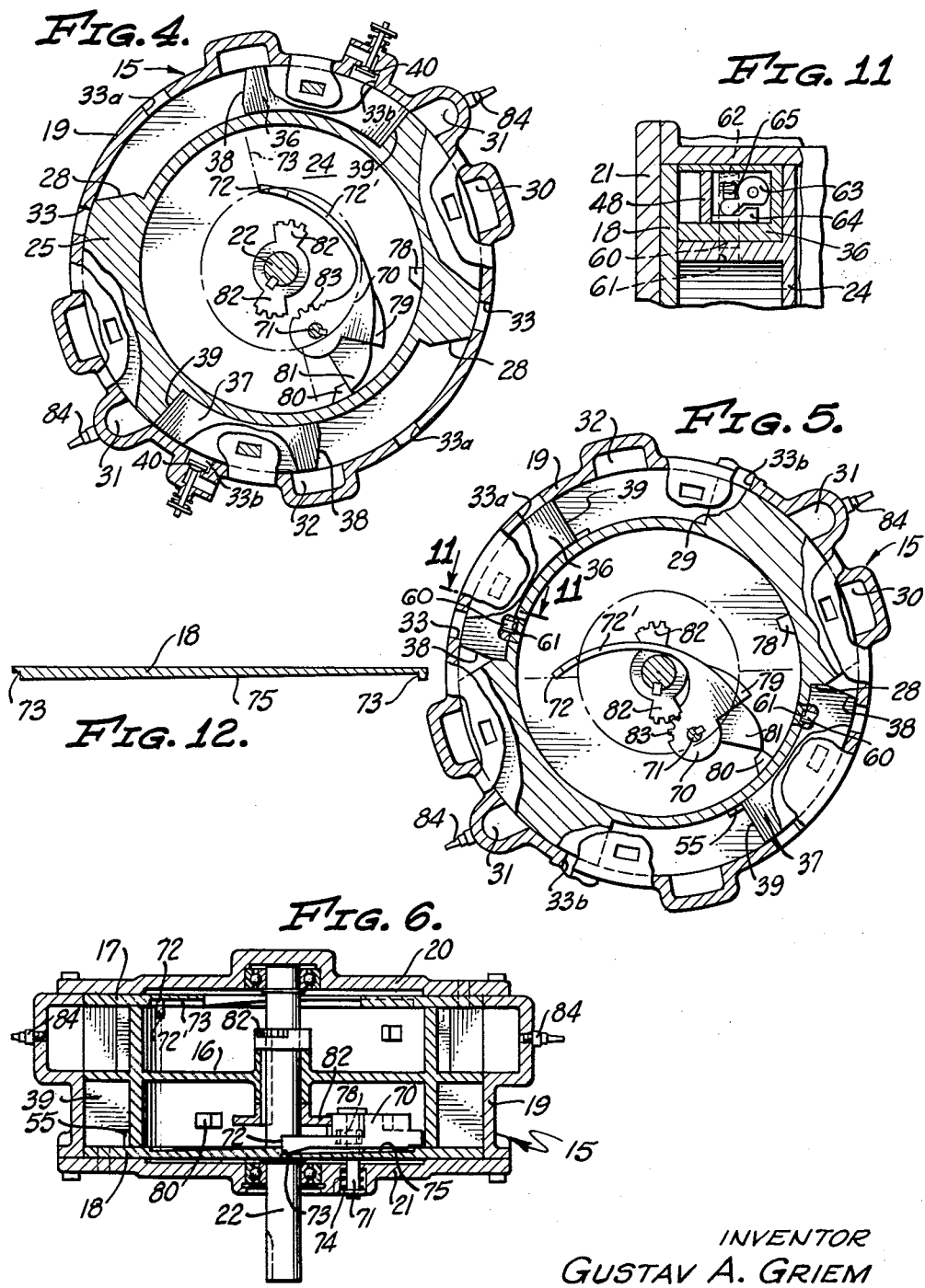

United States Patent Office
3,063,433
Patented Nov. 13, 1962

3,063,433
ROTARY ENGINE
Gustav A. Griem, Los Angeles, Calif.
(630 W. Bonita Ave., Apt. M16, Claremont, Calif.)
Filed July 7, 1961, Ser. No. 122,579
8 Claims. (Cl. 123—11)

This invention relates to internal combustion engines and the like and, in particular, to a rotary type of engine. The present invention is similar in operation to that shown in my U.S. Patent No. 2,943,609 and constitutes an improvement thereon.

It is an object of the invention to provide a rotary engine having a rotor which rotates at substantially constant speed in a cylindrical housing, the rotor having an arcuate space carrying an arcuate piston or shuttle for rotation with the rotor, with the relative movement of the rotor and shuttle being controlled as a function of the rotor position to provide the fuel intake, compression and exhaust functions. A particular object is to provide such an engine in which the movement of the shuttle is positively controlled by the rotor and in which the shuttle is directly driven by the rotor.

It is an object of the invention to provide a rotary engine having an operating cycle with firing, exhaust-intake, and compression phases, and with the exhaust and intake occurring in the same operation. A particular object is to provide such an engine including a cylindrical housing having a fuel inlet opening, a fuel ignition opening and an exhaust opening, a rotor journaled in the housing for rotation therein with the rotor having an arcuate shuttle space moving past the inlet, ignition and exhaust openings in sequence as the rotor rotates, and an arcuate shuttle positioned in the shuttle space for rotation relative to the housing and reciprocation relative to the rotor. A further object is to provide such an engine including means for advancing the shuttle relative to the rotor to move the leading edge of the shuttle to the forward end of the shuttle space during the exhaust phase and following the compression phase, means for coupling the shuttle to the rotor following the compression phase and releasing the shuttle during the firing phase, detent means for restricting rotation of the shuttle during the firing phase and during the compression phase, and detent release means for releasing the detent means when the rear end of the shuttle space approaches the trailing edge of the shuttle. A further object is to provide a detent and coupler control mechanism in which the shuttle-rotor coupling and the shuttle-housing detenting are accomplished in synchronism.

It is another object of the invention to provide a rotary engine structure that can be adapted to compressor operation by driving the output shaft from an external source.

The invention also comprises novel details of construction and novel combinations and arrangements of parts, which will more fully appear in the course of the following description. The drawings merely show and the description merely describes a preferred embodiment of the present invention which is given by way of illustration or example.

In the drawings:

FIG. 1 is a sectional view showing the relation of the component just prior to firing;

FIGS. 2, 3, 4 and 5 are views similar to FIG. 1 showing the relation of the components during firing, exhaust and intake, compression, and following compression, respectively;

FIG. 6 is a sectional view taken along the line 6—6 of FIG. 1;

FIG. 7 is an enlarged partial sectional view taken along the line 7—7 of FIG. 1;

FIG. 8 is a partial sectional view taken along the line 8—8 of FIG. 7;

FIG. 9 is a partial sectional view taken along the line 9—9 of FIG. 7;

FIG. 10 is a partial sectional view taken along the line 10—10 of FIG 8;

FIG. 11 is an enlarged partial sectional view taken along the line 11—11 of FIG. 5; and FIG. 12 is a development of a cam surface on the shuttle plate.

The engine includes a housing 15, a rotor 16 and shuttle plates 17, 18. The housing comprises a cylindrical shell 19 and end plates 20, 21 affixed thereto. The rotor is carrier on a shaft 22 journaled in bearings in the end plates 20, 21.

The construction of the shuttle plates 17, 18 is identical and only the latter will be described in detail. Each shuttle plate is provided with two shuttle mechanisms providing two firings per revolution per shuttle plate. The engine could be manufactured with only a single shuttle plate if desired. Also, only one shuttle mechanism and one firing or three or more mechanisms can be used as desired. In the particular embodiment illustrated herein, one shuttle plate is advanced ninety degrees with respect to the other to provide alternate firings and a smoother operating engine.

The rotor 16 has a central web section 24 and a circumferential flange section 25. Relieved sections 26, 27 are provided in the flange 25 of the rotor, to serve as shuttle spaces. Each shuttle space has a forward end 28 and a rear end 29 (FIG. 3). The rotor rotates counter-clockwise as seen in FIGS. 1–5. The housing shell 19 includes a fuel inlet opening 30, a fuel ignition opening 31, and an exhaust opening 32. Vent openings, such as 33, 33a, 33b, may be provided to eliminate pressure buildups and vacuums in the areas adjacent the openings during the operation of the engine (FIG. 4). A check valve 40 should be provided at the opening 33b to prevent loss of pressure during firing.

Arcuate shuttles 36, 37 are carried on the shuttle plate 18 and are positioned in the shuttle spaces 26, 27, respectively. These shuttles are identical in construction and operation, each having a leading edge 38 and a trailing edge 39 (FIG. 1). The shuttle plates with the shuttles rotate freely in the housing, the shuttles being driven by the rotor in a particular sequence as will be described below.

The engine includes detent means for restricting rotation of the shuttle during the firing phase and during the compression phase. In the preferred embodiment illustrated herein, a detent bar 43 is carried in the shuttle for sliding motion parallel to the axis of rotation of the engine (FIGS. 7 and 9). Detent bar receptacles or openings 44, 45, 46, 47 are provided in the end plate 21 for receiving the detent bar. The detent bar 43 is fixed to a plate 48. An arm 49 projects from the plate 48 and terminates in a shoulder 50. The plate 48 slides in a cavity 51 in the shuttle 36 and compression springs 52, 53 act on the plate to urge the detent bar 43 outward into engagement with the openings in the end plate 21 as the shuttle moves past the openings.

The engine also includes detent release means for releasing the detent bar when the rear end of the shuttle space in the rotor approaches the trailing edge of the shuttle. The preferred form of this structure is best seen in FIGS. 7, 8 and 9. An arcuate push rod 54 is positioned in the shuttle for sliding movement along the direction of motion of the shuttle. A tab 55 on the push rod 54 extends beyond the trailing edge 39 of the shuttle for engagement by the wall of the rotor defining the rear end of the shuttle space in the rotor. An arm 56 is pivotally mounted in the cavity 51 of the shuttle between the forward end of the push rod 54 and the shoulder 50 of the detent plate 48. Forward motion of the push rod 54 causes the arm 56 to rotate clockwise, as seen in FIG. 7, compress the springs 52, and pull the detent bar 43 inward out of engagement with the end plate. A spring 57 is positioned between a wall 58 of the shuttle and a bracket 59 of the push rod 54 for urging the push rod to the position of FIG. 7, permitting the detent bar to move outward as it passes an opening in the end plate.

The engine also includes means for coupling the shuttle to the rotor for rotation with the rotor following the compression phase and releasing the shuttle from the rotor during the firing phase. In the preferred embodiment illustrated herein, the shuttle-rotor coupler comprises a plunger 60 carried in the shuttle 36 for radial sliding movement in the shuttle. A plunger opening 61 is provided in the rotor for receiving the plunger 60 and a spring 62 urges the plunger outward from the shuttle. The plunger is shown in the inward or disengaged posiiton in FIGS. 8 and 10 and in the outward or engaged position in FIG. 11.

A cam 63 is pivotally mounted in the cavity 51 of the shuttle for actuation by an arm 64 fixed to the detent plate 48. The plunger 60 includes a lug 65 which engages the cam 63 for actuation of the plunger by the cam. The plunger and cam are shown in the normal position in FIG. 10 with the spring 62 compressed and the plunger in the inward or disengaged position. When the detent plate 48 is translated by rotation of the arm 56 due to forward movement of the push rod 54, the arm 64 moves to the right as seen in FIG. 11, permitting the cam to rotate counterclockwise and the plunger to move outward from the shuttle into engagement with the rotor. When the detent bar 43 moves outward into one of the detent bar openings, the detent plate 48 moves to the left as seen in FIGS. 10 and 11, rotating the cam 63 clockwise and raising the plunger upward out of engagement with the rotor.

The engine also includes means for advancing the shuttle relative to the rotor during the exhaust phase and following the compression phase. In the preferred embodiment illustrated herein, an advancer arm 70 is mounted for rotation on a shaft 71 carried in the end plate 21. A similar advancer arm will be carried in the end plate 20 for use with the shuttle plate 17. The advancer arm includes a finger 72' having an end 72 for engaging a shoulder 73 in the shuttle plate 18 when the arm is moving in the forward or counterclockwise direction as viewed in FIGS. 1–5. A spring 74 is positioned on the shaft 71 for urging the advancer arm toward the shuttle plate. The shuttle plate is provided with a tapered surface 75, best seen in FIGS. 6 and 12, which permits the advancer arm to move in the reverse or clockwise direction relative to the shuttle plate without engaging the shuttle plate.

The rotor includes a first advancer arm drive member in the form of a lug 78 projecting inward from the flange 25 of the rotor for engagement with a shoulder 79 of the advancer arm (FIG. 4). A second advancer arm drive member in the form of another lug 80 is carried on the rotor for engaging a shoulder 81 of the advancer arm. A third advancer arm drive member in the form of a gear segment 82 fixed to the shaft 22 which drives the rotor, engages a mating gear section 83 on the advancer arm during certain portions of the operating cycle. The lugs 78 and 80 drive the advancer arm in the forward or counterclockwise direction as shown in FIGS. 2 and 4. The gear segment 82 drives the advancer arm in the reverse or clockwise direction, as shown in FIGS. 5 and 1.

While only a single advancer arm is shown for each shuttle plate, two oppositely positioned advancer arms could be utilized to provide a more balanced and powerful drive for the shuttle plate.

A source of fuel, such as a carburetor, is connected to the inlet openings 30. Suitable means for igniting the compressed fuel, such as a spark plug 84, is mounted in the ignition openings 31.

The operating cycle of the engine will be described in conjunction with FIGS. 1–5. The engine is shown just prior to firing in FIG. 1, with a charge of fuel compressed in the fuel ignition opening 31. The shuttle is fixed in place relative to the housing by engagement of the detent bar with the housing opening 46. The fuel charge is now fired causing counterclockwise rotation of the rotor. FIG. 2 shows the engine after firing with the front end 28 of the shuttle space approaching the exhaust opening 32. At the same time, the rear end 29 of the shuttle space engages the push rod 54 of the shuttle and moves the detent bar inward out of engagement with the housing to release the shuttle.

The lug 78 of the rotor engages the shoulder 79 of the advancer arm for rotating the advancer arm as the rotor rotates. The finger 72' of the advancer arm is engaging the shoulder 73 of the shuttle plate for rotating the shuttle as the advancer arm rotates. Because of the relative dimensions of the components, the advancer arm rotates through a considerably greater arc than the rotor during the engagement of the lug 78 and shoulder 79 thereby advancing the shuttle relative to the rotor. In the particular embodiment shown herein, the shuttle moves through about sixty degrees of arc while the rotor is moving through about twenty degrees of arc.

The lug 78 is dimensioned to cease driving the advancer arm when the detent bar 43 of the shuttle engages the opening 47 of the housing to again fix the shuttle as shown in FIG. 3. This forward motion of the shuttle has pushed the exhaust gases out the exhaust opening 32 and at the same time has created a vacuum in the shuttle space to draw a fresh charge of fuel into the shuttle space through the intake opening 30. Continued rotation of the rotor to the position of FIG. 4 compresses the new fuel charge into the ignition opening 31. At this point, the rotor again contacts the shuttle detent release push rod to withdraw the detent bar and free the shuttle for further motion. The lug 80 of the rotor now engages the shoulder 81 of the advancer arm and again moves the shuttle forward relative to the rotor to bring the leading edge 38 of the shuttle to the forward end 28 of the shuttle space and align the shuttle-rotor coupler plunger 60 with the plunger opening 61, locking the shuttle to the rotor as seen in FIG. 5. The compressed fuel charge is sealed in the ignition opening 31 and the rotor continues to rotate with the shuttle to the position of FIG. 1 where the engine is again ready for firing. As the shuttle reaches the position of FIG. 1, the detent bar engages the detent opening in the housing and thereby withdraws the coupler plunger from engagement with the rotor.

Referring again to FIG. 5, after the lug 80 is free of the advancer arm, the gear segment 82 engages the advancer arm for rotating the advancer arm in the reverse direction to return it to the starting position of FIG. 1.

It should be noted that the machine of the invention can be used as a compressor by driving the shaft 22 from an external source with the fluid to be compressed being drawn in through the intake opening 30 in the same manner as a charge of fuel. The compressed fluid is expelled through the ignition opening 31, which may be referred to as the compression opening.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a rotary engine having an operating cycle with firing, exhaust and compression phases, the combination of:
- a cylindrical housing having a fuel inlet opening, a fuel ignition opening and an exhaust opening;
- a rotor journaled in said housing for rotation therein, said rotor having an arcuate shuttle space with a forward end and a rear end, with said space moving past said inlet, ignition and exhaust openings in sequence as said rotor rotates;
- an arcuate shuttle positioned in said shuttle space for rotation relative to said housing, such shuttle occupying a lesser arc than said space for oscillation therein, and having a leading edge and a trailing edge;
- means for advancing said shuttle relative to said rotor to move the leading edge of said shuttle toward the forward end of said shuttle space during the exhaust phase and following the compression phase;
- means for coupling said shuttle to said rotor following the compression phase and releasing said shuttle during the firing phase;
- detent means for restricting rotation of said shuttle during the firing phase and during the compression phase;
- and detent release means for releasing said detent means when the rear end of said shuttle space approaches the trailing edge of said shuttle.

2. In a rotary engine having an operating cycle with firing, exhaust and compression phases, the combination of:
- a cylindrical housing having a fuel inlet opening, a fuel ignition opening and an exhaust opening;
- a rotor journaled in said housing for rotation therein, said rotor having an arcuate shuttle space with a forward end and a rear end, with said space moving past said inlet, ignition and exhaust openings in sequence as said rotor rotates;
- an arcuate shuttle positioned in said shuttle space for rotation relative to said housing, such shuttle occupying a lesser arc than said space for oscillation therein, and having a leading edge and a trailing edge;
- means driven by said rotor for advancing said shuttle relative to said rotor to move the leading edge of said shuttle toward the forward end of said shuttle space during the exhaust phase and following the compression phase;
- means for coupling said shuttle to said rotor for rotation with said rotor following the compression phase and releasing said shuttle from said rotor during the firing phase;
- detent means carried in said shuttle for engaging said housing and restricting rotation of said shuttle during the firing phase and during the compression phase;
- and detent release means carried in said shuttle for engagement by said rotor when the rear end of said shuttle space approaches the trailing edge of said shuttle for disengaging said detent means from said housing.

3. In a rotary engine having an operating cycle with firing, exhaust and compression phases, the combination of:
- a cylindrical housing having a fuel inlet opening, a fuel ignition opening and an exhaust opening;
- a rotor journaled in said housing for rotation therein, said rotor having an arcuate shuttle space with a forward end and a rear end, with said space moving past said inlet, ignition and exhaust openings in sequence as said rotor rotates;
- an arcuate shuttle positioned in said shuttle space for rotation relative to said housing, such shuttle occupying a lesser arc than said space for oscillation therein, and having a leading edge and a trailing edge;
- means for advancing said shuttle relative to said rotor to move the leading edge of said shuttle toward the forward end of said shuttle space during the exhaust phase and following the compression phase, said means including a shuttle advancer arm pivotally mounted in said housing and engageable with a shoulder in said shuttle when pivoting in the forward direction, a first drive member on said rotor for engaging and pivoting said advancer arm in the forward direction during the exhaust phase, a second drive member on said rotor for engaging and pivoting said advancer arm in the forward direction following the compression phase, and a third drive member on said rotor for engaging and pivoting said advancer arm in the reverse direction prior to the next exhaust phase;
- means for coupling said shuttle to said rotor following the compression phase and releasing said shuttle during the firing phase;
- detent means for restricting rotation of said shuttle during the firing phase and during the intake phase;
- and detent release means for releasing said detent means when the rear end of said shuttle space approaches the trailing edge of said shuttle.

4. In a rotary engine having an operating cycle with firing, exhaust and compression phases, the combination of:
- a cylindrical housing having a fuel inlet opening, a fuel ignition opening and an exhaust opening;
- a rotor journaled in said housing for rotation therein, said rotor having an arcuate shuttle space with a forward end and a rear end, with said space moving past said inlet, ignition and exhaust openings in sequence as said rotor rotates;
- an arcuate shuttle positioned in said shuttle space for rotation relative to said housing, such shuttle occupying a lesser arc than said space for oscillation therein, and having a leading edge and a trailing edge;
- means for advancing said shuttle relative to said rotor to move the leading edge of said shuttle toward the forward end of said shuttle space during the exhaust phase and following the compression phase;
- means for coupling said shuttle to said rotor following the compression phase and releasing said shuttle during the firing phase, said means including a plunger slidingly positioned in said shuttle, a spring urging said plunger outward toward a plunger receptacle in said rotor, and a lever system within said shuttle for moving said plunger inward against the action of said spring;
- detent means for restricting rotation of said shuttle during the firing phase and during the intake phase, with said detent means coupled to said lever system for extracting said plunger when restricting rotation of said shuttle;
- and detent release means for releasing said detent means when the rear end of said shuttle space approaches the trailing edge of said shuttle.

5. In a rotary engine having an operating cycle with firing, exhaust and compression phases, the combination of:
- a cylindrical housing having a fuel inlet opening, a fuel ignition opening and an exhaust opening;
- a rotor journaled in said housing for rotation therein, said rotor having an arcuate shuttle space with a forward end and a rear end, with said space moving past said inlet, ignition and exhaust openings in sequence as said rotor rotates;
- an arcuate shuttle positioned in said shuttle space for rotation relative to said housing, such shuttle occupying a lesser arc than said space for oscillation therein, and having a leading edge and a trailing edge;
- means for advancing said shuttle relative to said rotor to move the leading edge of said shuttle toward the forward end of said shuttle space during the exhaust phase and following the compression phase;

means for coupling said shuttle to said rotor following the compression phase and releasing said shuttle during the firing phase;

a detent bar slidingly positioned in said shuttle;

a spring urging said bar outward into bar receptacles in said housing for restricting rotation of said shuttle during the firing phase and during the compression phase;

and a detent release mechanism including a rod slidingly posiitoned in said shuttle and normally projecting from the trailing edge thereof for engagement by the rear end of said shuttle space, with such engagement moving said rod forward to move said bar inward against the action of said spring.

6. In a rotary engine having an operating cycle with intake, compression, firing and exhaust phases, the combination of:

a cylindrical housing having a fuel inlet opening, a fuel ignition opening and an exhaust opening;

a rotor journaled in said housing for rotation therein, said rotor having an arcuate shuttle space with a forward end and a rear end, with said space moving past said inlet, ignition and exhaust openings in sequence as said rotor rotates;

an arcuate shuttle positioned in said shuttle space for rotation relative to said housing, such shuttle occupying a lesser arc than said space for oscillation therein, and having a leading edge and a trailing edge;

means for advancing said shuttle relative to said rotor to move the leading edge of said shuttle toward the forward end of said shuttle space during the exhaust phase and following the compression phase, said means including a shuttle advancer arm pivotally mounted in said housing and engageable with an advancing shoulder in said shuttle when pivoting in the forward direction, a first drive member on said rotor for engaging and pivoting said advancer arm in the forward direction during the exhaust phase, a second drive member on said rotor for engaging and pivoting said advancer arm in the forward direction following the compression phase, and a third drive member on said rotor for engaging and pivoting said advancer arm in the reverse direction prior to the next exhaust phase;

means for coupling said shuttle to said rotor following the compression phase and releasing said shuttle during the firing phase, said means including a plunger slidingly positioned in said shuttle, a coupler spring urging said plunger outward toward a plunger receptacle in said rotor, and a lever system within said shuttle for moving said plunger inward against the action of said coupler spring;

a detent bar slidingly positioned in said shuttle;

a detent spring urging said bar outward into bar receptacles in said housing for restricting rotation of said shuttle during the firing phase and during the compression phase, with said bar connected to said coupler lever system for extracting said plunger when said bar is extended;

and a detent release mechanism including a rod slidingly positioned in said shuttle and normally projecting from the trailing edge thereof for engagement by the rear end of said shuttle space, with such engagement moving said rod forward to move said bar inward against the action of said detent spring.

7. In a rotary machine, the combination of:

a cylindrical housing having a fluid inlet opening and a compression opening;

a rotor journaled in said housing for rotation therein, said rotor having an arcuate shuttle space with a forward end and a rear end, with said space moving past said inlet and compression openings in sequence as said rotor rotates;

an arcuate shuttle positioned in said shuttle space for rotation relative to said housing, such shuttle occupying a lesser arc than said space for oscillation therein, and having a leading edge and a trailing edge;

a detent means for restricting rotation of said shuttle with the trailing edge thereof adjacent said compression opening while the fluid is being compressed into said compression opening by said rotor;

detent release means for releasing said detent means when the rear end of said shuttle space approaches the trailing edge of said shuttle;

means for advancing said shuttle relative to said rotor to move the leading edge of said shuttle toward the forward end of said shuttle space following compression of the fluid;

and means for coupling said shuttle to said rotor when in the forward end following compression and releasing said shuttle when rotation thereof is restricted by said detent means.

8. In a rotary machine, the combination of:

a cylindrical housing having a fuel inlet opening, a fuel ignition opening and an exhaust opening;

a rotor journaled in said housing for rotation therein, said rotor having an arcuate shuttle space with a forward end and a rear end, with said space moving past said inlet, ignition and exhaust openings in sequence as said rotor rotates;

an arcuate shuttle positioned in said shuttle space for rotation relative to said housing, such shuttle occupying a lesser arc than said space for oscillation therein, and having a leading edge and a trailing edge;

detent means for restricting rotation of said shuttle with the leading edge thereof adjacent said ignition opening and again with the trailing edge adjacent said ignition opening;

detent release means for releasing said detent means when the rear end of said shuttle space approaches the trailing edge of said shuttle;

means for advancing said shuttle relative to said rotor to move the leading edge of said shuttle toward the forward end of said shuttle space after release of said detent means;

and means for coupling said shuttle to said rotor when said shuttle is approaching said inlet opening and releasing said shuttle when rotation thereof is restricted by said detent means.

No references cited.